United States Patent Office 3,318,888
Patented May 9, 1967

---

3,318,888
ACYLATING CYANURIC ACID
John H. Blumbergs, Highland Park, and Donald G. MacKellar, Trenton, N.J., assignors to FMC Corporation, New York, N.Y., a corporation of Delaware
No Drawing. Filed Apr. 9, 1965, Ser. No. 447,060
5 Claims. (Cl. 260—248)

This invention relates to a novel process for the preparation of acyl derivatives of cyanuric acid and more particularly to the direct acylation of cyanuric acid to produce triacyl derivatives thereof.

It is known that acetyl derivatives of cyanuric acid can be prepared in the laboratory by the action of acetyl chloride on trisilver cyanurate. This method has serious disadvantages for commercial production because a special step is required for converting cyanuric acid to its silver salt before it can be used as a reagent. Further, considerable cost is incurred in making the silver salt of cyanuric acid. Because of the costly processing and prohibitive loss of expensive silver, the above process has not been found commercially acceptable.

We have attempted to directly acylate cyanruic acid in order to produce the acyl derivatives thereof by the reaction of an acyl chloride and cyanuric acid. This is similar to the process described by Tazuma et al. for preparing trialkyl derivatives of cyanuric acid as described in U.S. Patent 3,075,979, issued on Jan. 29, 1963, and assigned to the present assignee, in which cyanuric acid is reacted directly with an alkyl chloride. By means of this technique we have obtained direct acylation of cyanuric acid but yields are extremely low, far below that required for commercial operation. We have also attempted to acylate cyanuric acid by reacting ketene with cyanuric acid in the presence of an acid catalyst. This technique has been found successful for the direct acylation of other nitrogen containing compounds as reported in Chem. Abstracts (1953), volume 45, at page 3233 and the Journal of Organic Chemistry (1958), volume 23, at pages 915 and 916. However, it has been found that a reaction between cyanuric acid and ketene does not take place under these conditions and that more than 98% of the cyanuric acid reagent remains unreacted.

As a result a new process has been desired for acylating cyanuric acid on a commercial scale to form acyl derivatives (and preferably the triacetyl derivative) of cyanuric acid in good yields and in a simplified process.

These and other objects will be apparent from the folllowing disclosure.

We have found that cyanuric acid can be directly acylated using a ketene as the acylating agent by bringing cyanuric acid and the ketene in contact with one another at temperatures of about 10 to about 100° C. in an organic reaction medium and in the presence of a base catalyst selected from the group consisting of (a) alkali metal and alkaline earth metal salts of weak acids, said salts having a $pK_b$ not greater than about 10.5 and (b) tertiary amines or quaternary ammonium compounds that have a $pK_b$ not greater than about 8.5

The term $pK_b$ as used refers to the negative logarithm (to base 10) of the basicity constant, $K_b$; the basicity constant is determined by the degree of acquisition of protons from water by a base, with concomitant liberation of hydroxyl ions.

In carrying out the present invention, a ketene, which is a compound having the formula:

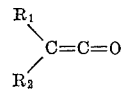

wherein $R_1$ and $R_2$ represent hydrogen or hydrocarbon radicals, is reacted with a compound having the formula:

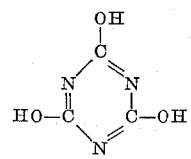

to produce an acyl derivative having the formula:

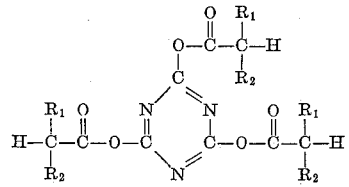

wherein $R_1$ and $R_2$ represent hydrogen or hydrocarbon radicals. The parent compound, ketene, $CH_2\!=\!C\!=\!O$, is preferably employed as the ketene in this reaction, but its monosubstituted aliphatic and aromatic homologues such as methyl ketene, ethyl ketene, propyl ketene, butyl ketene and phenyl ketene may be employed. Disubstituted, aliphatic or aromatic ketenes such as diethyl ketene, dipropyl ketene, butyl ethyl ketene and diphenyl ketene or the like may also be employed.

The present process requires a select class of basic catalyst for carrying out the acylation. These catalysts fall into two classes. The first are alkali metal and alkaline earth metal salts of weak acids, said salts having a $pK_b$ not greater than about 10.5. The second class of catalysts are tertiary amines and quaternary ammonium compounds that have a $pK_b$ of not greater than about 8.5. The term $pK_b$ as used refers to the negative logarithm (to base 10) of the basicity constant, $K_b$; the basicity constant is determined by the degree of acquisition of protons from water by a base, with concomitant liberation of hydroxyl ions.

Typical catalysts include sodium acetate, potassium acetate, trisodium cyanurate, disodium cyanurate, sodium carbonate, sodium benzoate, and calcium acetate. Tertiary amine catalysts that have been found effective are aliphatic teritiary amines such as triethyl amine and trimethyl amine. Other tertiary amines such as pyridine and dimethyl aniline have not been found effective. Quaternary ammonium compounds which are effective catalysts include tetramethylammonium acetate and tetraethylammonium acetate. The above defined basic catalysts are necessary for carrying out the present invention since otherwise the ketene does not react with the cyanuric acid.

The reaction is carried out in an organic reaction medium which is essentially inert with respect to the reactants and the final product. In addition, the organic reaction medium is chosen so that it satisfied two other requirements. The first requirement is that the catalyst employed in the reaction, be soluble in the medium to an extent sufficient for effective catalytic action. The second requirement is that the cyanuric acid reagent be soluble to the extent of at least 100 p.p.m. in the medium.

The preferred reaction medium is acetone. Others which have been found suitable are tetrahydrofuran, dioxane, methyl ethyl ketone and ethylene glycol ethers. These reaction media are particularly effective when using inorganic salts such as sodium acetate as the catalyst. Other reaction media which have been found particularly effective when using tertiary amines as catalysts are ethyl acetate and other acetates having longer aliphatic chains, e.g. isopropyl acetate, butyl acetate. Also, alkyl ether or acetyl derivations of ethylene glycol have been found to be suitable solvents. These include ethylene glycol dimethyl ether, ethylene glycol monomethyl ether acetate, ethylene glycol diacetate, ethylene glycol diethyl ether, ethylene glycol monoethyl ether acetate and the like.

In carrying out the present process the cyanuric acid is added to the organic reaction medium, e.g. acetone, and the mixture is stirred to form a suspension or slurry. In general, cyanuric acid is largely insoluble in the reaction medium and substantial quantities of the cyanuric acid remain undissolved. Thereafter, the desired catalyst is added to the reaction mixture and the ketene is added gradually to the mixture. As the reaction proceeds, and the cyanuric acid is converted to its acyl derivative, the resultant product preferably dissolves in the reaction medium leaving only the unreacted cyanuric acid. When the reaction is completed, all of the cyanuric acid is converted to its acyl derivative and is dissolved in the reaction medium. The final product is recovered from the reaction medium by crystallizing the final product from the solution or by evaporating the reaction medium from the remaining product.

The reaction is run at temperatures of from about 10 to about 100° C. Temperatures lower than 10° C. may be employed but the reaction rate becomes so low that the reaction time required is extended beyond commercially acceptable limits. Temperatures higher than 100° C. can also be used in carrying out the reaction, but at these high temperatures, the product is subject to undesirable decomposition with concomitant loss of yields and product contamination.

The reaction is normally carried out in an organic reaction medium in the absence of water. The presence of material amounts of water during the reaction is undesirable, since water reacts with the ketene reagent to form the corresponding carboxylic acid. However, small amounts of water in the mixture, e.g. up to about 2% which are taken up by the ketene reagent at the commencement of the reaction, do not adversely affect the subsequent reaction.

In a continuous, process, cyanuric acid and a ketene are fed into a container continuously in about stoichiometric proportions. A portion of the reaction medium is removed, free of undissolved cyanuric acid, and this portion of the solution is treated by either vacuum evaporation or by cooling to crystallize the final product from the solution. Thereafter, the separated organic solution is recycled back to the reactor. In this manner a relatively pure product can be removed from the reaction zone free of undissolved cyanuric acid and the dissolved product separated from the reaction medium.

Surprisingly, the ketene reaction with cyanuric acid does not occur even in the presence of the instant catalysts in reaction media such as benzene, chloroform and carbon tetrachloride. These media, heretofore, have generally been used to carry out reactions involving ketenes. The exact reason for this is not known but it is believed that these prior, well-known reaction media do not meet the solubility requirements of the present reaction medium.

In the preferred embodiment, the reaction medium should be able to dissolve substantially all of the final product as it is formed in the process. This is desirable because it facilitates separation from unreacted cyanuric acid. However, the product can be recovered whether it remains in solution or as a slurry. The final reaction product can be dissolved in the reaction medium either by maintaining sufficient amounts of the reaction medium to dissolve all of the resultant product, or by selecting a reaction medium whose solubility for the final product is sufficiently high to dissolve the amount produced.

The following examples are given to illustrate the present invention and are not deemed to be limiting thereof.

EXAMPLE 1

*Run A—Process of the Invention.*—A ketene generator was set up in accordance with the description given in the Journal of Organic Chemistry (1940), 5, page 122, by Jonathan W. Williams et al. The flow of ketene gas was controlled by the same method used in this publication. A three-necked, 1000 ml. glass reaction flask with baffled indentations, equipped with a hollow-shaft stirrer, was charged with 500 ml. of acetone, 16.1 g. (0.125 mole) of cyanuric acid and 0.7 g. of anhydrous sodium carbonate. The temperature of the mixture was increased to 45–60° C. and ketene was introduced into the mixture from the generator, with vigorous agitation, at a rate of 0.125 mole per minute through the hollow-shaft stirrer. Unreacted ketene was permitted to pass outward through one of the three necks into a condenser and collected.

After 45 minutes of reaction almost all of the solids were dissolved and the ketene flow was stopped. The reaction mixture was filtered to remove solids and the filtrate was evaporated under reduced pressure. The solids remaining after evaporation were worked up by successive washings with ether, dried, and weighed. The product weighed 30.5 g. and was analyzed by conventional micro-analysis methods for carbon, hydrogen and nitrogen. The following results were obtained.

Calculated (based on triacetyl cyanurate): C, 42.36%; H, 3.55%; N, 16.48%. Found: C, 42.02%; H, 3.55%; N, 16.40%.

The product was identified as the triacetyl derivative of cyanuric acid and the yield was 96% based on the cyanuric acid feed.

*Run B—Prior Art Catalysts.*—A second run was carried out in the same manner as set forth in Run A except that 0.7 g. of para-toluene sulfonic acid was used as the catalyst. No triacetyl cyanuric acid product was formed and 98% of the cyanuric acid was recovered unreacted. Additional runs were made using 0.7 g. of concentrated sulfuric acid and 0.7 g. of sodium bisulfite as the catalyst. In none of these runs was any triacetyl cyanurate produced.

EXAMPLE 2

A ketene generator was set up in the same manner as specified in Example 1. In this case the reaction vessel was a 100 ml. three-necked flask assembled with a hollow-shaft stirring rod. The flask was charged with cyanuric acid and catalyst and filled with acetone solvent. The amount of cyanuric acid used and the amount and type of catalyst employed are set forth in Table I.

The resultant mixture was vigorously stirred and ketene, generated from the ketene generator, was passed into the slurry through the hollow-shaft stirring rod at a rate of 0.008 mole per minute for a total of 35 minutes. Temperature of the reaction mixture was maintained at 40–50° C. by means of a hot water bath. Thereafter, the reaction was terminated and the reaction mixture was filtered to remove any remaining solids. The filtrate was evaporated under reduced pressure and any remaining solids were worked up with ether extractions, dried and weighed. The amounts of triacetyl cyanuric acid product obtained with the various catalysts is set forth in Table I.

EXAMPLE 3

The procedure of Example 2 was repeated using the same reaction conditions except that a variety of reaction media was employed as substitutes for acetone. In all cases the reaction flask was charged with 7.0 g. of cyanuric acid and the amount of catalyst set forth in Table II. Thereafter, the flask was filled with the solvent specified in Table II. After termination of reaction, any remaining product was isolated and worked up as specified in Example 2. The results are set forth in Table II.

EXAMPLE 4

*Run A—Process of the Invention.*—Diphenyl ketene was prepared by the method of L. I. Smith and H. H. Hoehn, reported in Organic Synthesis, Coll. vol. III, pp. 356–358. The diphenyl ketene was reacted with cyanuric acid in the same equipment as described in Example 2. The reaction flask was charged with 3.5 g. cyanuric acid and 0.25 g. of sodium acetate and was filled with acetone solvent. Then 15.8 g. of diphenyl ketene was slowly added over a period of 5 minutes. The reaction mixture was stirred for an additional 15 minutes and was filtered. The product was isolated in the same way as described in Example 2. There were obtained 17.6 g. of a white, crystalline material which was identified as tris-(diphenyl acetyl)-cyanurate. The yield was 91.8% based on the cyanuric acid feed.

*Run B—Prior Art Catalysts.*—The same reaction as described above was repeated by using 0.25 g. of methane sulfonic acid as the catalyst instead of 0.25 g. of sodium acetate. No product was obtained and 98% of the cyanuric acid was recovered unreacted.

In the preceding examples the catalyst was added in amounts of about 4% by weight of the cyanuric acid charge. However, it should be realized that the use of any amount of catalyst that is effective, up to about 10% by weight of the cyanuric acid charge, is contemplated in the present invention. The use of catalyst in amounts greater than 10% by weight of cyanuric acid is possible, but is wasteful since no appreciable benefit is obtained by maintaining an excess of the catalyst.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Process for producing acyl derivatives of cyanuric acid which comprises reacting cyanuric acid with at least stoichiometric quantities of a ketene having the formula:

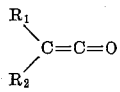

wherein $R_1$ and $R_2$ are radicals selected from the group consisting of hydrogen, alkyl and aromatic radicals, at a temperature of from about 10 to about 100° C. in an inert reaction medium and in the presence of catalytic amounts of a base catalyst selected from the group consisting of
 (a) alkali metal and alkaline earth metal salts of weak acids, said salts having a $pK_b$ not greater than about 10.5, and
 (b) tertiary amines and quaternary ammonium compounds having a $pK_b$ of not greater than about 8.5,

TABLE I

| Run No. | Cyanuric Acid Charge, g. | Catalyst Used | | Unreacted Solids Recovered, g. | Product Obtained, g. | Percent Yield [1] | Remarks |
|---|---|---|---|---|---|---|---|
| | | Name | G. | | | | |
| 1 | 7.1 | Sodium acetate, anhydrous | 0.3 | 0.4 | 13.4 | 95.7 | |
| 2 | 7.0 | ____do____ | 0.5 | 0.6 | 13.1 | 95.0 | |
| 3 | 7.1 | No catalyst | | 6.84 | 0 | 0 | 96.4% cyanuric acid recovered unreacted. |
| 4 | 7.0 | Trisodium cyanurate | 0.3 | 1.00 | 12.1 | 87.5 | |
| 5 | 7.0 | Disodium cyanurate | 0.3 | 0.4 | 13.2 | 95.4 | |
| 6 | 7.0 | Monosodium cyanurate | 0.3 | 6.6 | 1.1 | 8.0 | 90% cyanuric acid recovered unreacted. |
| 7 | 7.0 | Dry Soda Ash | 0.3 | 0.4 | 13.5 | 97.7 | |
| 8 | 7.1 | Sodium benzoate | 0.36 | 0.4 | 13.2 | 94.4 | |
| 9 | 7.0 | Sodium fluoride | 0.32 | 5.4 | 2.4 | 17.4 | 72% cyanuric acid recovered unreacted. |
| 10 | 7.0 | Triethyl amine | 0.5 | 0.1 | 13.4 | 95.7 | |
| 11 | 7.0 | Trimethyl amine | 0.5 | 0.1 | 13.1 | 94.7 | |
| 12 | 7.0 | N-Dimethyl aniline | 0.5 | 6.8 | 0 | 0 | 97.2% cyanuric acid recovered unreacted. |
| 13 | 7.0 | Pyridine | 0.5 | 3.1 | 0 | 0 | No product obtained, tar formation. |
| 14 | 13.0 | ____do____ | 0.4 | 6.2 | 0 | 0 | No product, tar formation. |
| 15 | 7.0 | Calcium acetate | 0.5 | 0.6 | 13.0 | 94.2 | |
| 16 | 7.0 | Tetramethylammonium acetate. | 0.5 | 0.3 | 12.8 | 92.8 | |

[1] Percent yield calculated on basis of cyanuric acid feed.

TABLE II

| Run No. | Solvent Used | Catalyst Used | | Unreacted Solids Recovered, g. | Product Obtained, g. | Percent Yield [1] | Remarks |
|---|---|---|---|---|---|---|---|
| | | Name | G. | | | | |
| 1 | Acetone | Sodium acetate, anhydrous. | 0.3 | 0.58 | 13.5 | 96.0 | |
| 2 | Benzene | ____do____ | 0.3 | 7.2 | 0 | 0 | 98.5% cyanuric acid recovered unreacted. |
| 3 | Carbon tetracholride | ____do____ | 0.3 | 7.2 | 0 | 0 | Do. |
| 4 | Diethyl ether | ____do____ | 0.3 | 7.2 | 0 | 0 | Do. |
| 5 | Isopropyl ether | ____do____ | 0.3 | 7.2 | 0 | 0 | Do. |
| 6 | Ethyl acetate | ____do____ | 0.3 | 4.6 | 5.4 | 39.0 | 60% cyanuric acid recovered unreacted. |
| 7 | Ethyl acetate | Triethyl amine | 0.5 | 0.1 | 13.4 | 95.8 | |
| 8 | Benezene | ____do____ | 0.5 | 5.8 | 2.0 | 14.5 | 83% cyanuricacid recovered unreacted. |
| 9 | Carbon Tetrachloride | ____do____ | 0.5 | 6.1 | 1.6 | 11.6 | 87% cyanuric acid recovered unreacted. |
| 10 | Tetrahydrofuran | Sodium acetate, anhydrous. | 0.32 | 0.3 | 12.7 | 92.0 | |
| 11 | Dioxane | ____do____ | 0.3 | 0.5 | 12.0 | 87.0 | |
| 12 | Methyl ethyl ketone | ____do____ | 0.3 | 1.8 | 10.6 | 75.8 | 21% cyanuric acid recovered unreacted. |
| 13 | Ethylene glycol diethyl ether. | Triethyl amine | 0.5 | 1.8 | 10.0 | 72.5 | 25% cyanuric acid recovered unreacted. |

[1] Percent yield calculated on basis of cyanuric acid feed.

said base catalyst and said cyanuric acid being sufficiently soluble in said inert reaction medium to permit said reaction to proceed, and recovering said acyl derivative from said reaction medium.

2. Process for producing acyl derivatives of cyanuric acid which comprises reacting cyanuric acid with at least stoichiometric quantities of a ketene having the formula:

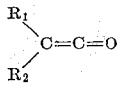

wherein $R_1$ and $R_2$ are radicals selected from the group consisting of hydrogen, alkyl and aromatic radicals, at a temperature of from about 10 to about 100° C. in an inert reaction medium selected from the group consisting of acetone, tetrahydrofuran, dioxane, methyl ethyl ketone, ethyl acetate, alkyl ethers of ethylene glycol, and acetyl esters of ethylene glycol, and in the presence of catalytic amounts of a base catalyst selected from the group consisting of (a) alkali metal and alkaline earth metal salts of weak acids, said salts having a $pK_b$ not greater than about 10.5, and (b) tertiary amines and quaternary ammonium compounds having a $pK_b$ of not greater than about 8.5, and recovering said acyl derivative from said reaction medium.

3. Process of claim 1 in which said inert solvent is acetone.

4. Process of claim 1 wherein said base catalyst is sodium acetate.

5. Process for producing the trisacetyl derivative of cyanuric acid which comprises reacting cyanuric acid with at least stoichiometric quantities of ketene at a temperature of from about 10 to about 100° C. in an acetone reaction medium in the presence of catalytic amounts of a sodium acetate catalyst.

References Cited by the Examiner

Dunbar, J. Org. Chem., vol. 23, pp. 915–16 (1958), QD241J6.

WALTER A. MODANCE, *Primary Examiner.*

JOHN M. FORD, *Assistant Examiner.*